US010241740B2

(12) United States Patent
Seefeldt et al.

(10) Patent No.: US 10,241,740 B2
(45) Date of Patent: Mar. 26, 2019

(54) SOUND REFLECTIONS FOR PORTABLE ASSEMBLIES

(71) Applicant: Dolby Laboratories Licensing Corporation, San Francisco, CA (US)

(72) Inventors: Alan J. Seefeldt, San Francisco, CA (US); Lucas E. Saule, San Francisco, CA (US); Vincent Voron, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 101 days.

(21) Appl. No.: 14/994,073

(22) Filed: Jan. 12, 2016

(65) Prior Publication Data

US 2016/0219364 A1    Jul. 28, 2016

Related U.S. Application Data

(60) Provisional application No. 62/108,201, filed on Jan. 27, 2015.

(51) Int. Cl.
*G06F 3/16* (2006.01)
*G10K 11/28* (2006.01)
*H04R 1/40* (2006.01)
*H04R 1/02* (2006.01)
*H04R 1/34* (2006.01)

(52) U.S. Cl.
CPC ............... *G06F 3/16* (2013.01); *G10K 11/28* (2013.01); *H04R 1/403* (2013.01); *H04R 1/028* (2013.01); *H04R 1/345* (2013.01); *H04R 2205/026* (2013.01)

(58) Field of Classification Search
CPC ........ H04R 1/028; H04R 1/345; H04R 1/403; H04R 2205/024; H04R 2205/026; G06F 3/16; G10K 11/28
USPC ...................................................... 381/333
See application file for complete search history.

(56) References Cited

U.S. PATENT DOCUMENTS 8,783,328 B2    7/2014  Melhart
2007/0034694 A1*  2/2007  Jensen .................. G07F 9/02
                                                      235/439

(Continued)

FOREIGN PATENT DOCUMENTS

JP    S60-259086    12/1985
JP    H06-78392     3/1994

OTHER PUBLICATIONS

Elipson, "Elipson revives a classic design to celebrate its 60th anniversary", Jan. 19, 2012, What Hi-Fi?*

(Continued)

*Primary Examiner* — Paul Kim

(57) ABSTRACT

A sound reflection assembly comprises a rigid structure having a sound reflection section and a support section, a rigid part in the support section, etc. A directional sound generation module is placed on the rigid part. The directional sound generation module is spatially oriented to direct sound waves generated by one or more speaker elements in the directional sound generation module towards the sound reflection section to be reflected by the sound reflection section towards an audience in an audience area in front of the sound reflection assembly. The directional sound generation module may be a sound bar.

25 Claims, 8 Drawing Sheets

(56) References Cited

U.S. PATENT DOCUMENTS

| | | | | |
|---|---|---|---|---|
| 2010/0215205 A1* | 8/2010 | Nagao | ................... | A47B 81/06 |
| | | | | 381/388 |
| 2013/0314513 A1* | 11/2013 | White | ............... | G02B 27/2292 |
| | | | | 348/54 |
| 2013/0331153 A1* | 12/2013 | Krimstock | .......... | H04M 1/6041 |
| | | | | 455/569.1 |
| 2014/0126753 A1* | 5/2014 | Takumai | ................ | H04S 7/305 |
| | | | | 381/303 |
| 2016/0180831 A1* | 6/2016 | Boden | ................... | G10K 11/28 |
| | | | | 181/175 |

OTHER PUBLICATIONS

The Exhibition—Inspiration http://kayontheradio.word press.com/2013/05/05/the-exhibition-inspiration/.

"Portable Trade Show Booths—Video Stands & Workstations," Godfrey Group, accessed on Sep. 8, 2014, http://www.godfreygroup.com/products/pedestals-kiosks-workstations/video-stands-workstations-pedestals.html.

"Elipson revives a classic design to celebrate its 60th anniversary," What Hi-Fi?, Jan. 19, 2012, http://www.whathifi.com/news/elipson-revives-classic-design-to-celebrate-its-60th-anniversary.

* cited by examiner

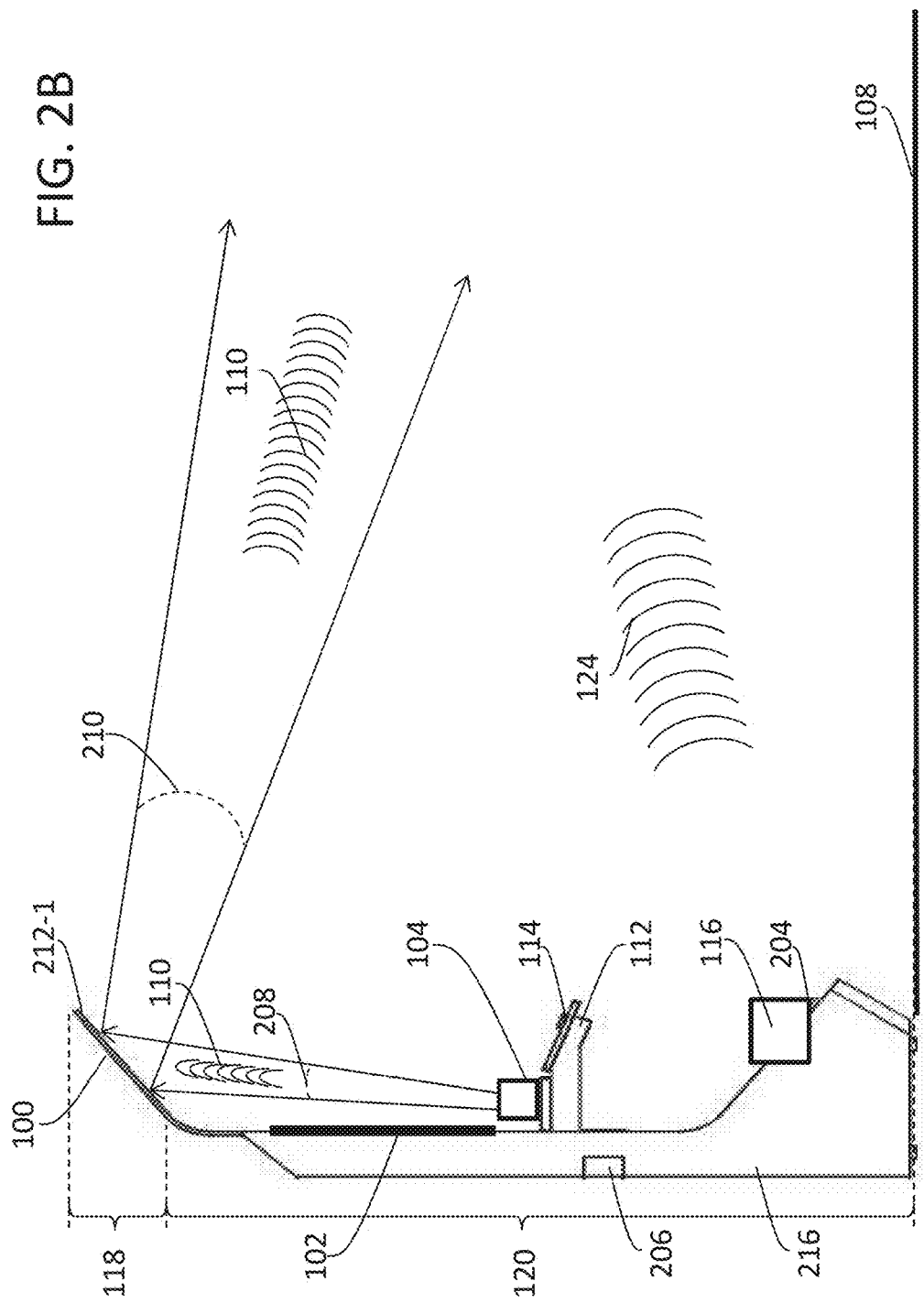

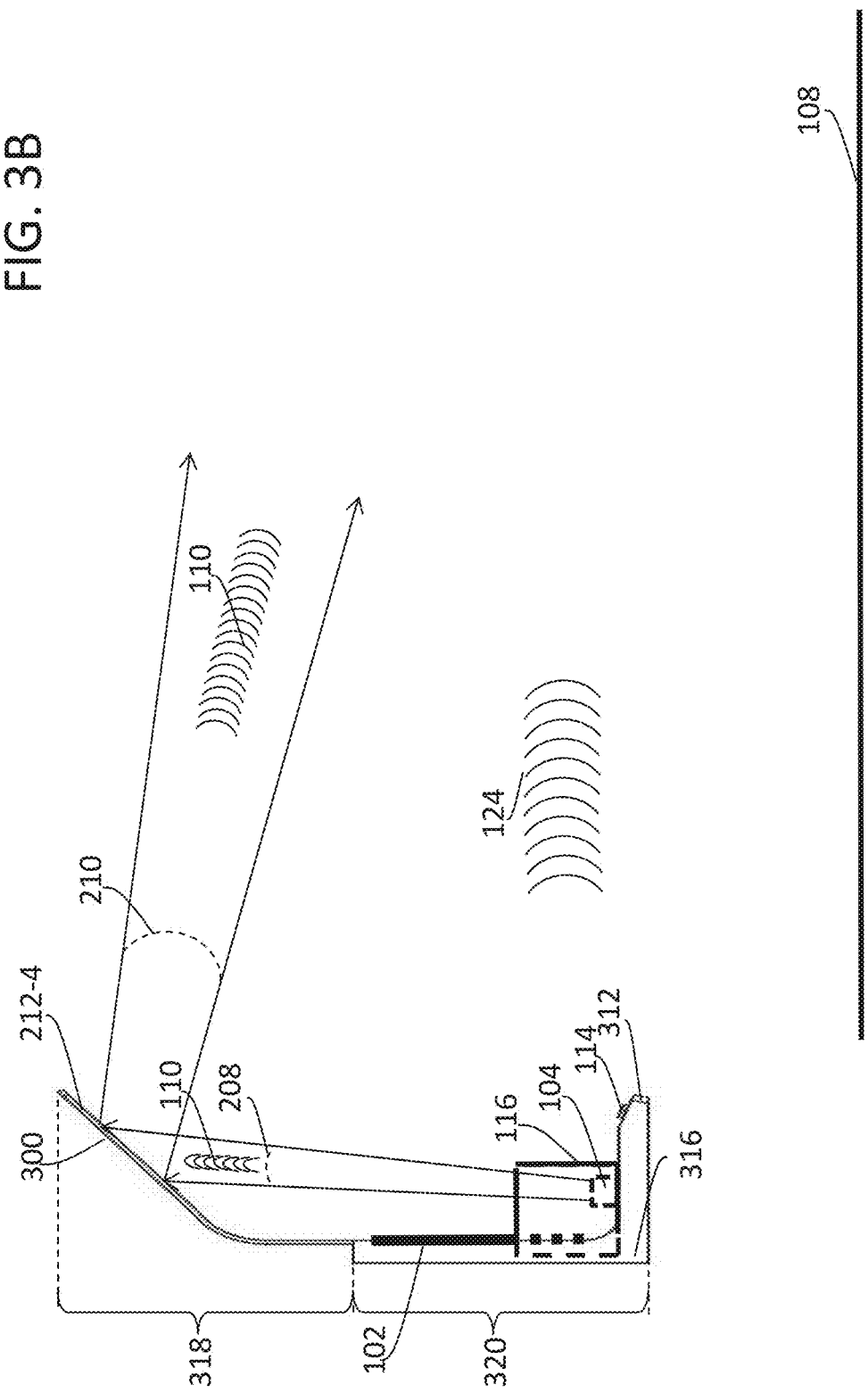

SOUND REFLECTIONS FOR PORTABLE ASSEMBLIES

CROSS-REFERENCE TO RELATED APPLICATIONS

The present application claims the benefit of priority from U.S. Provisional Patent application Ser. No. 62/108,201, filed on Jan. 27, 2015, which is incorporated herein by reference in its entirety.

TECHNOLOGY

The present invention relates to sound wave propagation, and in particular related to reflecting sound waves in a portable assembly.

BACKGROUND

Sound waves as physical waves may be reflected at physical boundaries separating different materials with different sound wave propagation properties. For example, sound waves emitted from speakers in a theater may be reflected by outer surface areas of theater walls in the interior of the theater, since these outer surface areas represent physical boundaries separating a first material such as air, which has first sound wave propagation properties, from a second material such as a paneling material forming the theater walls, which has second different sound wave propagation properties.

While it is comparatively easy to specially design sound reflection or absorption a relatively well defined setting such as a theater, a concert hall, a home theater, etc., it is much more difficult to attempt to do so in a general setting such as a relatively open arena, an expo venue, a trade show, etc., with portable sound system assemblies, variable audience areas, variable sound source positions, etc.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A through FIG. 2D illustrate views of a sound reflection assemblies in a first example configuration; and FIG. 3A through FIG. 3D illustrate views of a sound reflection assemblies in a second example configuration.

DESCRIPTION OF EXAMPLE EMBODIMENTS

Figure 1A:
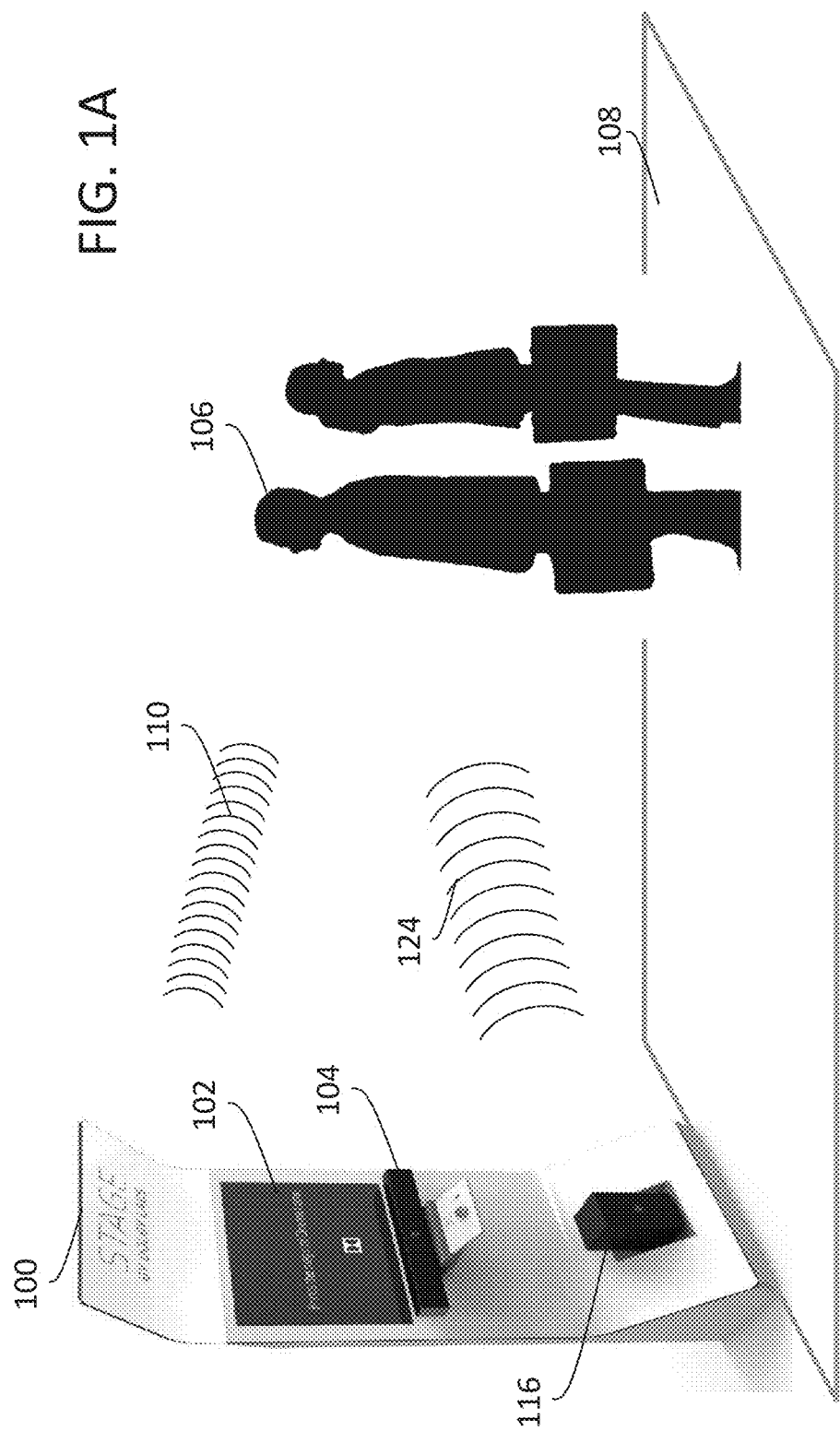
FIG. 1A and FIG. 1B depict an example sound reflection assembly.

Example embodiments, which relate to reflecting sound waves in a portable assembly, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. AN EXAMPLE SOUND REFLECTION ASSEMBLY
3. A FIRST EXAMPLE CONFIGURATION
4. A SECOND EXAMPLE CONFIGURATION
5. EXAMPLE EMBODIMENTS
6. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below.

Techniques as described herein can be used to provide a sound reflection assembly integrated with an image display, speaker elements, etc., that can be housed in a relatively small enclosure such as a seven (7) feet by four (4) feet by two (2) feet enclosure positioned at the same level as that an audience area, a four (4) feet by four (4) feet by two (2) feet enclosure on a raised platform, etc.

The sound reflection assembly can integrate a large screen display with a virtual speaker configuration capable of producing excellent visual and sound experiences. In some embodiments, the sound reflection assembly is configured to allow the display to take up a substantial amount of a front surface of the sound reflection assembly facing an audience (e.g., listeners/viewers, visitors at an expo, etc.). For example, the display integrated with the sound reflection assembly may be as wide as the width (e.g., 4 feet, etc.) of the sound reflection assembly. The display integrated with the sound reflection assembly may also take a substantial amount of the height (e.g., 3 feet or more, etc.) of the sound reflection assembly.

In some embodiments, the sound reflection assembly is configured to allow one or more sound generation modules to be positioned with the sound reflection assembly at one or more specific positions of the sound reflection assembly. A variety of speaker elements such as left speaker elements, right speaker elements, center speaker elements, low frequency effect (LFE) speaker elements, etc., can be provided by the sound generation modules. In some embodiments, multiple different types of speaker elements can be housed in a single physical enclosure such as a sound bar, an arc shape physical enclosure, etc., which can be easily integrated with or positioned on the sound reflection assembly.

In some embodiments, the sound generation modules integrated with the sound reflection assembly comprise a set of directional speaker elements such as left speaker elements, right speaker elements, center speaker elements, etc. A directional speaker element as described herein emits directional sound waves into a single spatial direction (e.g., a single solid angle, etc.), or into one or more specific spatial directions (e.g., one or more specific solid angles, etc.). Additionally, optionally, or alternatively, the sound generation modules comprise a set of non-directional speaker elements such as LFE speaker elements, subwoofers, etc. A non-directional speaker element as described herein emits omnidirectional sound waves into any spatial direction (e.g., a $4\pi$ spherical solid angle, etc.).

In some embodiments, the directional sound waves and/or omnidirectional sound waves generated by the directional speaker elements and/or non-directional speaker elements integrated with the sound reflection assembly may portray a sound image field that correspond to images rendered on the display. The directional sound waves generated by the directional speaker elements may correspond to or represent sound waves from one or more sound sources in or related to a scene portrayed by the images rendered on the display. The omnidirectional sound waves generated by the non-directional speaker elements may correspond to or represent sound waves from one or more ambient sound or background sound sources in or related to a scene portrayed by the images rendered on the display.

In some embodiments, a sound reflection assembly as described herein comprises at least one sound reflection section that can be used to generate a virtual speaker configuration that has relatively large spatial dimensions as compared with those of the sound reflection assembly. For example, the sound reflection assembly may comprise a sound reflection section that is located in the upper part of a rigid structure of the sound reflection assembly and inclined toward an intended audience area.

Directional sound waves as described herein can be beamed from one or more specific locations of the sound reflection assembly toward a sound reflective surface in the sound reflection section. The sound reflective surface may be engineered specifically to reflect some or all of sound wave frequencies (e.g., evenly, etc.) across the entire or a substantial part of the audible band to the human auditory system. The directional sound waves can be reflected from the sound reflection section to reach an audience in the audience area as if the directional sound waves from virtual speaker elements that are located at mirrored locations of the actual speaker elements as mirrored by the sound reflective surface in the sound reflection section. Thus, depending on an inclined angle of the sound reflective surface and spatial relationships between the speaker elements and the sound reflective surface, the virtual speaker elements can be located as high as twice the height of the sound reflection assembly and as wide as twice the width of the sound reflection assembly.

For example, speaker elements that are located inches away in a sound bar may be mirrored into a virtual speaker configuration with spatial dimensions doubling the width and height dimensions of the sound reflection assembly. This relatively wide and high (virtual) speaker configuration can be used to portray a relatively expansive sound image field and support rendering of media content with represented sound sources (e.g., those represented in ATMOS audio content or objects, etc.) from a wide solid angle from the perspective of a listener in the audience area.

A sound reflection assembly as described herein can be used as at least a part of a wide variety of speaker configurations. These speaker configurations may include, but are not limited to only, any of 5.1 audio speaker configuration, 7.3 speaker configuration, etc. For example, in some embodiments, while some directional speaker elements generate and direct sound waves to a sound reflective surface in the sound reflection assembly, some other directional speaker elements generate and direct sound waves away from the sound reflective surface. A sound reflection section in the sound reflection assembly may be permanently installed or alternatively may be detachable. Different spatial properties (e.g., curvature, dimensions, etc.), different sound related properties (e.g., sound reflectance, structural surface features, etc.), etc., can be provisioned with the sound reflection section in different applications of the techniques as described herein.

In some embodiments, image rendering light emitted from or reflected off from a display integrated with a sound reflection assembly as described herein can reach an audience area in front of the sound reflection assembly without any obstruction. In some embodiments, directional sound waves that are directed to a sound reflective surface of the sound reflection assembly are directed away from the display.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. AN EXAMPLE SOUND REFLECTION ASSEMBLY

FIG. 1A depicts a view of an example sound reflection assembly 100 with a display 102, a sound bar 104, etc. Examples of displays as described herein may include but are not limited to only, any of LCD displays, OLED displays, backlit displays, side-lit displays, projection displays, etc. Images rendered on the display (102) and sound waves 110 generated by the sound bar (104) may be directed to an audience 106 in a front area 108 in front of the sound reflection assembly (100). Additionally, optionally, or alternatively, a LFE speaker 116 such as a subwoofer, etc., is disposed with the sound reflection assembly (100) to emit low frequency sound waves 124 (e.g., booming sounds, etc.). In various embodiments, the sound reflection assembly (100) may or may not comprise a base with wheels used to move around the sound reflection assembly (100) at a venue such as a relatively open arena, an expo venue, a trade show, etc. In some embodiments, the sound reflection assembly (100) may comprise a base with (e.g., adjustable, non-adjustable, etc.) footers with frictional materials, locking mechanisms, levelers, etc., to add stationary stability of the sound reflection assembly (100) when placed on a (e.g., leveled, inclined, etc.) floor.

Figure 1B:
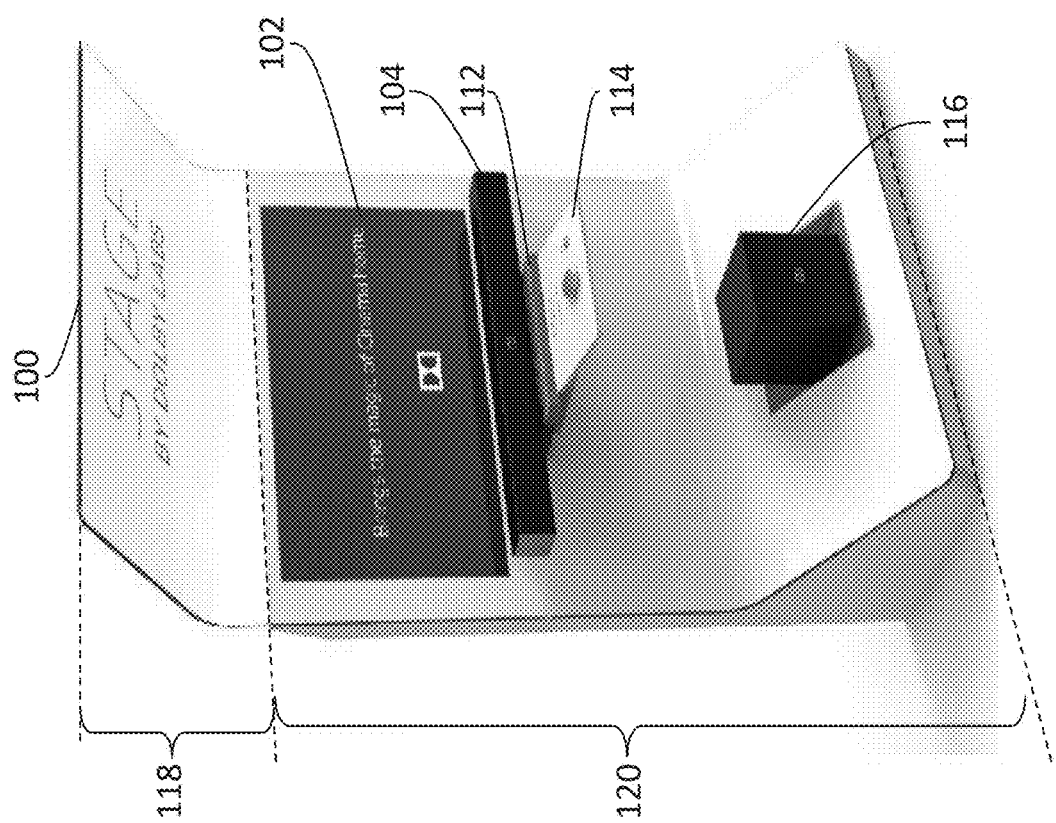

FIG. 1B depicts an expanded view of the sound reflection assembly (100) with the display (102), the sound bar (104), the LFE speaker (116), etc. As shown, the sound reflection assembly (100) comprises a rigid structure having a sound reflection section 118 and a support section 120. In some embodiments, the display (102) may be directly mounted (e.g., with one or more brackets, etc.) onto the support section (120). In some embodiments, a rigid part 112 protrudes from the support section (120). The sound bar (104) may be disposed, or mounted (e.g., securely, detachably, etc.), on the top surface of the rigid part (112). Additionally, optionally, or alternatively, one or more user interface devices 114 may be mounted on or disposed with the rigid part (112). In some embodiments, the rigid part (112) is mounted on the support section (120), for example, through one or more detachable and/or non-detachable securing means such as brackets, screws, etc. In some other embodiments, the rigid part (112) is molded unitarily with the support section (120).

Additionally, optionally, or alternatively, the LFE speaker (116) may be mounted or disposed with the support section (120), for example, on a specifically configured surface in a lower part of the support section (120).

The sound bar (104) is spatially oriented to direct the sound waves (110) generated by speaker elements in the sound bar (104) toward the sound reflection section (118).

As used herein, a sound bar (e.g., 104, etc.) refers to a sound generation device that comprises audio transducers, speaker elements, etc., within a physical enclosure to generate sound waves (e.g., 110, etc.) such as one or more of directional sound waves, multi-directional sound waves, omnidirectional sound waves, etc. Each of the audio transducers, speaker elements, etc., in the sound bar (104) may represent, but is not limited to only, one or more of: left speaker elements, right speaker elements, center speaker elements, LFE speaker elements, etc. The physical enclosure of the sound bar (104) may be of a physical shape with a length in a longitudinal direction (e.g., 216 of FIG. 2A or FIG. 3A, etc.) larger than spatial dimensions in directions orthogonal to the longitudinal direction. In some embodiments, the length in the longitudinal direction (216) of the physical shape of the sound bar (104) is at least 2 times, 3 times, 4 times, 5 times, etc., larger than spatial dimensions in directions orthogonal to the longitudinal direction (216).

In some embodiments, a support section (e.g., 120, etc.) as described herein represents a lower section of a rigid structure of a sound reflection assembly (e.g., 100, etc.) in relation to a sound reflection section (e.g., 118, etc.) of the sound reflection assembly (100). In some embodiments, a support section as described herein represents one or more of lower sections, upper sections, left sections, right sections, etc., of a rigid structure of a sound reflection assembly in relation to a sound reflection section of the sound reflection assembly.

In some embodiments, a sound reflection section (e.g., 118, etc.) as described herein represents an upper section of a rigid structure of a sound reflection assembly (e.g., 100, etc.) in relation to a support section (e.g., 120, etc.) of the sound reflection assembly (e.g., 100, etc.). In some embodiments, a sound reflection section as described herein represents one or more of lower sections, upper sections, left sections, right sections, etc., of a rigid structure of a sound reflection assembly in relation to a support section of the sound reflection assembly.

3. A FIRST EXAMPLE CONFIGURATION

Figure 2A:
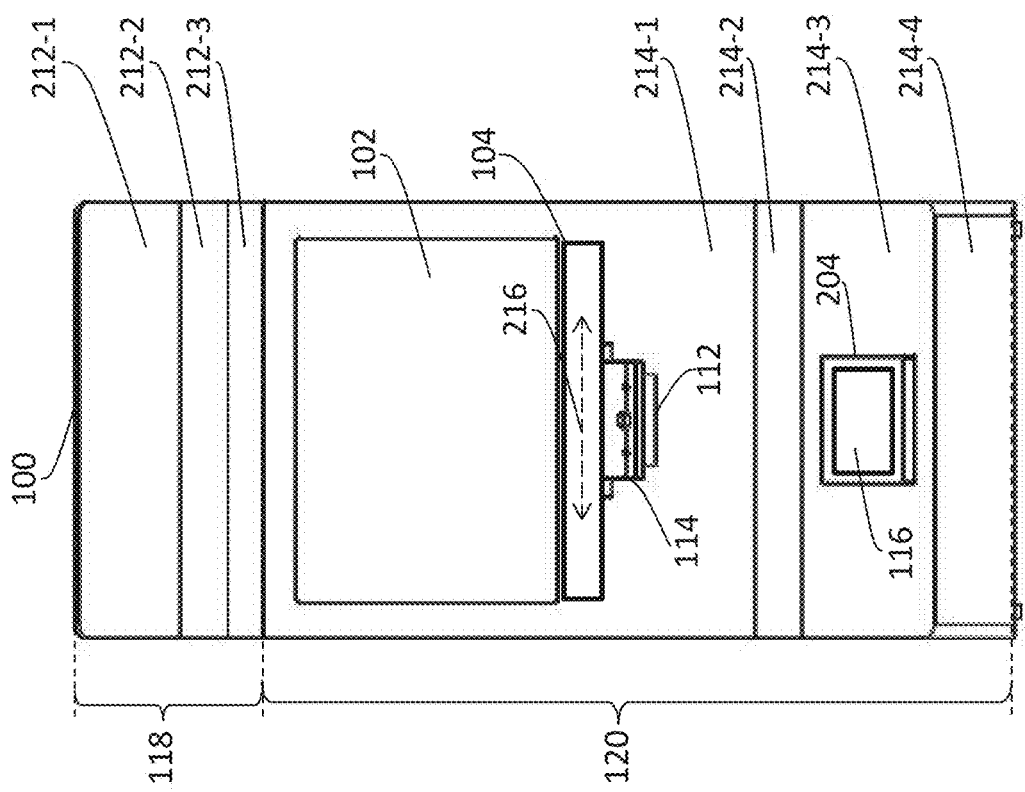
Figure 2D:
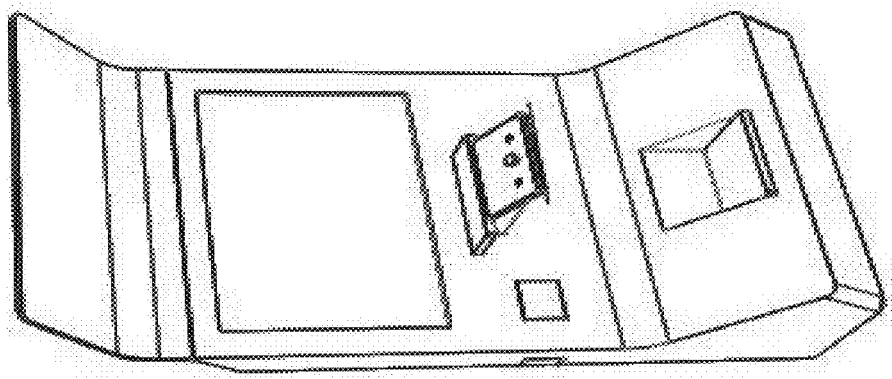
Figure 2C:
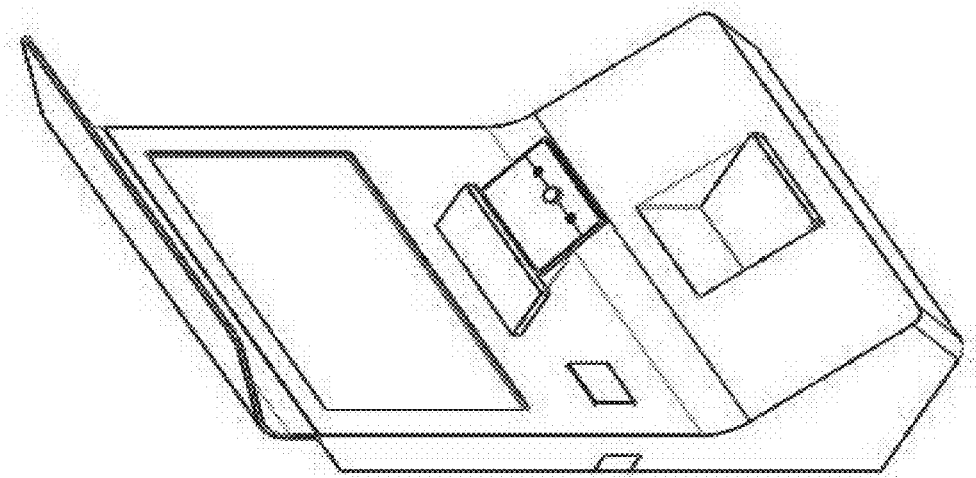

Example views of a sound reflection assembly (e.g., 100 of FIG. 1A or FIG. 1B, etc.) in a first configuration are illustrated in FIG. 2A through FIG. 2D. FIG. 2A illustrates an example front view of the sound reflection assembly (100) as viewed with an isometric perspective from a direction of an audience area (e.g., 108 of FIG. 1A, etc.). The audience area (108) can be anywhere from in front of the sound reflection assembly (100) to five to ten feet or even farther from the sound reflection assembly (100). An audience (e.g., 106 of FIG. 1A, etc.) with a certain eye level such as less than three feet, three feet or more, etc., located in the audience area (108) in front of the sound reflection assembly (100) can view an image in its entirety as rendered on a display (e.g., 102 of FIG. 1A or FIG. 1B, etc.) with unimpeded lines of sight.

The sound reflection assembly (100) comprises a front (physical) surface facing the audience (106) in the audience area (108). The front surface of the sound reflection assembly (100) is made up of reflection section surfaces (e.g., 212-1 through 212-3, etc.) of a sound reflection section (e.g., 118 of FIG. 1A or FIG. 1B, etc.), support section surfaces (e.g., 214-1 through 214-4, etc.) of a support section (e.g., 120 of FIG. 1A or FIG. 1B, etc.), etc.

In some embodiments, the rendition of images on the display (102) are synchronized with the generation of sound waves (e.g., 110 and/or 124 of FIG. 1A, etc.) by a sound bar (e.g., 104 of FIG. 1A, etc.) and/or a LFE speaker (e.g., 116 of FIG. 1A, etc.). In some embodiments, one or more computing devices may be used to render the images and drive (audio transducers in) the sound bar (104) and/or the LFE speaker (116) to generate the sound waves (110 and/or 124).

In some embodiments, the support section surface (214-1) as shown in FIG. 2A comprises a planar surface, which may, but is not limited to only, be flushed (or coplanar) with the front image viewing area of the display (102). In some embodiments, the planar surface in the support section surface (214-1) may be vertical in relation to an imaginary plane extending from the audience area (108). In some embodiments, the planar surface in the support section surface (214-1) may be may be slightly inclined, such as within 5 degrees, 15 degrees, etc., from a vertical direction to the imaginary plane extending from the audience area (108).

In some embodiments, while the sound bar (104) is supported by or mounted on a first rigid support (e.g., 112 of FIG. 1A or FIG. 1B, etc.), the display (102) is supported by or mounted on a second rigid part (not shown) of the support section (120).

In some embodiments, a sound generation device such as a LFE speaker (e.g., 116 of FIG. 1A or FIG. 1B, etc.) may be placed on a base in a triangular spatial void 204 formed in the support section (120), or cut out from the support section surface (214-3) as shown in FIG. 2A.

In some embodiments, the sound reflection section (118) comprises a (e.g., planar, curved, etc.) surface slanted or inclined (e.g., 45 degrees, etc.) towards the audience area (108). A portion or all of the surface of the sound reflection section (118) can be specifically treated to reflect the sound waves (110) with (e.g., high, even, etc.) reflectance in one or more selected ranges of audible frequencies such as a broad range, a multi-band range, a single-band range, etc., over all or some parts of the whole audible frequency spectrum (e.g., 20 to 20 kHz, etc.) to the human auditory system.

In some embodiments, a longitudinal direction 216 of the sound bar (104) is parallel to one or more planar surface (e.g., 212-1, 214-1, etc.) in the reflection section surfaces (212-1 through 212-3), in the support section surfaces (214-1 through 214-4), in (e.g., an image rendering surface of, etc.) the display (102), etc.

FIG. 2B illustrates an example side view of the sound reflection assembly (100) as viewed with an isometric perspective from a position (e.g., an infinite position, etc.) coplanar with the support section surface (214-1 of FIG. 2A) in the support section (120).

As illustrated in FIG. 2B, the sound waves (110) generated by the sound bar (104) may be directional and transmitted toward the sound reflection section (118), or a portion of the reflection section surface (212-1) thereof, in a solid angle 208. In some embodiments, the support section (120) is so structured as not to present any physical hindrance in sound wave propagation directions in the solid angle (208) from the sound bar (104) to the portion of the reflection section surface (212-1).

In some embodiments, most (e.g., 51%, 60%, 70%, 80%, 90%, 95% or more, etc.) or even all of the energy of the sound waves (110) generated by the sound bar (104) is transmitted within the first solid angle (208) from the sound bar (104) to the sound reflection section (118), or the portion of the reflection section surface (212-1) thereof. In some embodiments, the sound bar (104) is specifically configured to direct the sound waves (110) away from other areas such as the display (102) mounted with the sound bar (104), the support section surfaces (214-1 through 214-4 of FIG. 2A) of the support section (120), etc.

Additionally, optionally, or alternatively, the sound reflection section (118) may be specifically configured to reflect the sound waves (110) incident on the portion of the sound reflection surface (212-1) with high reflectance into a second solid angle 210 in which high quality sound (e.g., stereoscopic sound field images, two-dimensional sound field images, etc.) originated from the sound bar (104) is provided to the audience (106) in the audience area (108). In some embodiments, the second solid angle (210) in which most (e.g., 51%, 60%, 70%, 80%, 90%, 95% or more, etc.) or even all of the energy of the sound waves (110) reflected by the sound reflection section (118) is transmitted is the same as, or the substantially same as (e.g., within a 5% difference, within a 10% difference, etc.), the first solid angle (208). In some embodiments, the sound waves (110) reflecting off the sound reflection section (118) travels along a longer path from the sound bar (104) to the audience (106) in the audience area (108) than a path (e.g., a single straight line, etc.) along which the sound waves (110) would travel directly from the sound bar (104) to the audience (106) in the audience area (108). Thus, even in the case in which the first solid angle (208) and the second solid angle (210) are the same, the sound reflection assembly (100) as described herein can reach a relatively large audience in the audience area (210) than without the sound reflection assembly (100) to reflect the sound waves (110) generated by the sound bar (104).

In some embodiments, the second solid angle (210) in which most (e.g., 51%, 60%, 70%, 80%, 90%, 95% or more, etc.) or even all of the energy of the sound waves (110) reflected by the sound reflection section (118) is transmitted is less than the first solid angle (208). For example, the sound reflection assembly (100) may be configured to be listened by an audience (e.g., 106 of FIG. 1A, etc.) located in a relatively confined audience area (e.g., 108 of FIG. 1A, etc.).

In some embodiments, the second solid angle (210) in which most (e.g., 51%, 60%, 70%, 80%, 90%, 95% or more, etc.) or even all of the energy of the sound waves (110) reflected by the sound reflection section (118) is transmitted is larger than the first solid angle (208). For example, the sound reflection assembly (100) may be configured to be listened by an audience (e.g., 106 of FIG. 1A, etc.) located in a relatively expansive audience area (e.g., 108 of FIG. 1A, etc.).

In some embodiments, the portion of the sound reflection surface (212-1), in the sound reflection section (118), on which the sound waves (110) generated by the sound bar (104) incident, may be configured to be divergent in sound reflection and to make the second solid angle 210 greater than the first solid angle 208 to provide high quality sound (e.g., stereoscopic sound field images, two-dimensional sound field images, etc.) over a relatively large audience area (e.g., 108).

In some embodiments, the portion of the sound reflection surface (212-1), in the sound reflection section (118), on which the sound waves (110) generated by the sound bar (104) incident, may be configured to be one of a planar surface, a curved surface, a grooved surface, a textured surface, a bumpy surface, etc. In some embodiments, one or more of specific spatial features, sound-related properties, etc., may be implemented in the sound reflection section (118), or the portion of the reflection section surface (212-1) therein. These specific spatial features, sound-related properties, etc., may be particular to the type of the sound bar (104), one or more types of speaker elements in the sound bar (104), etc.

In some embodiments, the portion of the reflection section surface (212-1), in the sound reflection section (118), on which the sound waves (110) generated by the sound bar (104) incident, may be implemented with one or more of specific spatial features, sound-related properties, etc., to be (e.g., highly, etc.) reflective or (e.g., spatially divergent, spatially convergent, etc.) directional of frequencies, frequency bands, frequency ranges, frequency compositions, etc., as generated by the sound bar (104).

In some embodiments, at least one of specific spatial features, sound-related properties, etc., as described herein is implemented with a sound reflection assembly as described herein (e.g., 100 of FIG. 1A, FIG. 1B, FIG. 2A through FIG. 2D, 300 of FIG. 3A through FIG. 3D, etc.) in the factory. In some embodiments, at least one of specific spatial features, sound-related properties, etc., as described herein is not permanently implemented with a sound reflection assembly as described herein (e.g., 100 of FIG. 1A, FIG. 1B, FIG. 2A through FIG. 2D, 300 of FIG. 3A through FIG. 3D, etc.) and can be changed after the sound reflection assembly (100) has been released to an end user or customer. For example, in these embodiments, one or more of detachable or re-attachable strips, patches, panels, etc., with desired sound reflective properties, sound-related properties, etc., can be mounted on or disposed with a sound reflection assembly as described herein (e.g., 100 of FIG. 1A, FIG. 1B, FIG. 2A through FIG. 2D, 300 of FIG. 3A through FIG. 3D, etc.).

In some embodiments, the support section (120) may comprise a back support infrastructure enclosed by an outer surface 216 as shown in FIG. 2B. The back support infrastructure may be designed to provide mechanical stability to the sound reflection assembly (100) with which the display (102), the sound bar (104), the LFE speaker (116), etc., are mounted or disposed. Additionally, optionally, or alternatively, the outer surface (216) of the back support infrastructure comprises a technician access panel 206, which may be opened by a technician to service audio and/or video modules integrated with the sound reflection assembly (100), access data ports of audio and/or video modules in the back support infrastructure, etc.

In some embodiments, as shown in FIG. 2B, the support section (120) provides no, or is free of, physical hindrance for lines of sight from the audience (106) in the audience area (108) to the display (102) placed in relation to (e.g., flush with, coplanar with, non-coplanar with, tilted from, etc.) the support section (120).

In some embodiments, one or more of the sound reflection section (118), the support section (120), etc., are not foldable. In some embodiments, at least a part of the sound reflection section (118), the support section (120), etc., is foldable.

In some embodiments, one or more of the sound reflection section (118), the support section (120), etc., are not movable (or immobile) relative to one another. In some embodiments, at least a part of the sound reflection section (118), the support section (120), etc., is movable relative to one another.

In some embodiments, one or more of the sound reflection section (118), the support section (120), etc., are rigid structures, or form a single rigid structure, for example to reduce sound vibration and sound dampening when the sound waves (110) generated by the sound bar (104) incident on the sound reflection section (118), thereby increasing sound reflection for these sound waves (110) from the sound reflection section (118).

In some embodiments, a sound bar (e.g., 104, etc.) as described herein generates (or a majority of) sound waves (e.g., 110, etc.) representing (e.g., virtual, etc.) sound sources as if these sound sources are emitting the sound waves (110) from specific directions and/or specific distances relative to a listener in an audience area (e.g., 108, etc.) as described herein. In some embodiments, a sound reflection assembly (e.g., 100, etc.), or a sound reflection section (e.g., 118, etc.) therein, are configured to reflect the sound waves (110) from the sound bar (104) in a manner that direction and/or distance information as represented by the sound waves (110) is preserved so that the listener can perceive a high quality sound field image when the listener's ears receives a portion of the sound waves (110).

In some embodiments, a LFE speaker (e.g., 106, etc.) as described herein generates sound waves (e.g., 124, etc.) that need not to be represented accurately in terms of direction and/or distance information as represented by the sound waves (124). In some embodiments, the sound waves (124) generated by the LFE speaker (106) may be directly transmitted from the LFE speaker (106), reflected from a support section (e.g., 120, etc.) rather than necessarily from a sound reflection section (e.g., 118, etc.), without impacting a high quality sound field image conveyed by sound waves (e.g., 110) generated by a sound bar (e.g., 104) as described herein.

The sound reflection assembly (100) can be contained in an enclosure. In a non-limiting example, the sound reflection assembly (100) has a height of three (3) to ten (10) feet, a width (in the horizontal direction of FIG. 2A) of about two (2) to six (6) feet, and a depth (in the horizontal direction of FIG. 2B) of one (1) to four (4) feet.

The sound reflection assembly (100) may comprise acoustic panels configured to reflect sound waves, for example, in the sound reflection section (118). The sound reflection assembly (100) may also comprise acoustic panels configured to absorb sound waves, for example, in parts immediately surrounding the sound bar (104). Various parts of the sound reflection assembly (100) may use one or more of medium-density fiberboard (MDF) materials, fiberglass, polyurethane, sheet metals, aluminum, alloy, solid wood, plastics, composite materials, hardboard, particle board, rubber, etc. Various parts of the sound reflection assembly (100) may be painted with eggshell paint materials, semigloss paint materials, flat or gloss paint materials, epoxy paint materials, etc.

4. A SECOND EXAMPLE CONFIGURATION

Figure 3A:
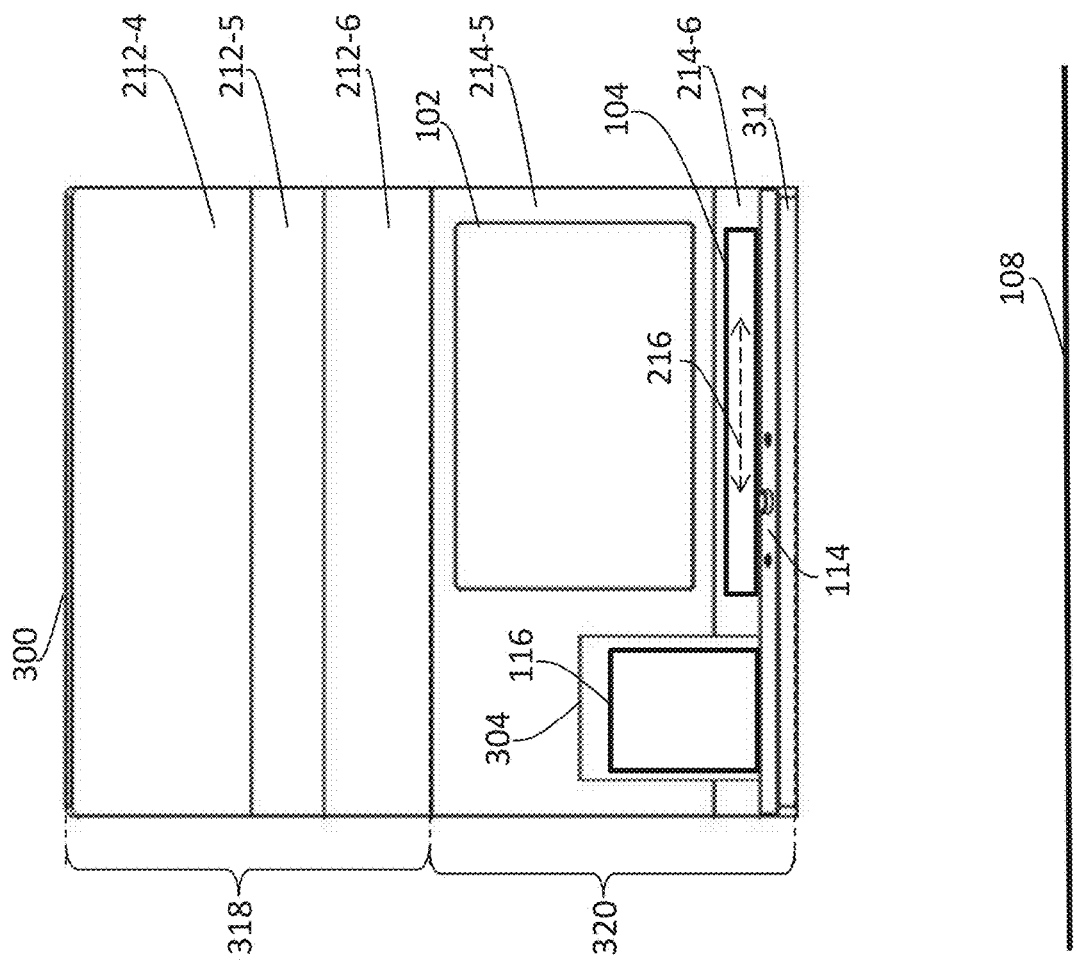
Figure 3D:
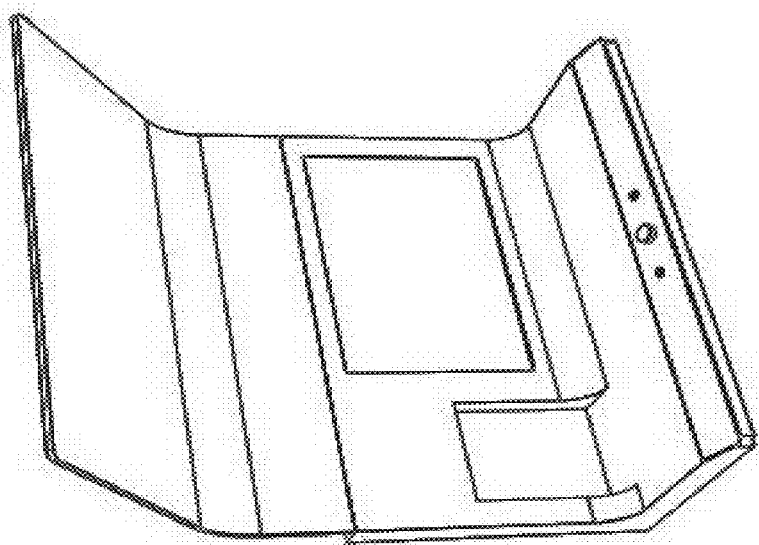
Figure 3C:
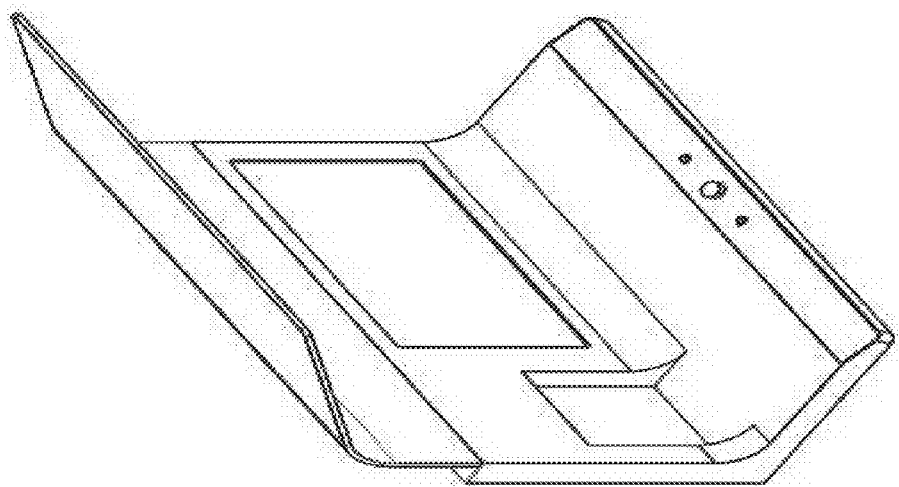

Example views of a sound reflection assembly 300 in a second configuration are illustrated in FIG. 3A through FIG. 3D. FIG. 3A illustrates an example front view of the sound reflection assembly (300) as viewed with an isometric perspective from a direction of an audience area (e.g., 108 of FIG. 3B, 108 of FIG. 1A in which the sound reflection assembly 100 is replaced by the sound reflection assembly 300, etc.). The audience area (108) can be anywhere from in front of the sound reflection assembly (300) to five to ten feet or even farther from the sound reflection assembly (100). An audience (e.g., 106 of FIG. 1A, etc.) with a certain eye level such as less than three feet, three feet or more, etc., located in the audience area (108) in front of the sound reflection assembly (300) can view an image in its entirety as rendered on a display 102 with unimpeded lines of sight.

The sound reflection assembly (300) comprises a front (physical) surface facing the audience (106 of FIG. 1A) in the audience area (108). The front surface of the sound reflection assembly (300) is made up of reflection section surfaces (e.g., 212-4 through 212-6, etc.) of a sound reflection section (e.g., 318, etc.), support section surfaces (e.g., 214-5 and 214-6, etc.) of a support section (e.g., 320, etc.), etc.

In some embodiments, the rendition of images on the display (102) are synchronized with the generation of sound waves (e.g., 110 and/or 126 of FIG. 1A in which the sound reflection assembly 100 is replaced by the sound reflection assembly 300, etc.) by a sound bar 104 and/or a LFE speaker 116. In some embodiments, one or more computing devices may be used to render the images and drive (audio transducers in) the sound bar (104) and/or the LFE speaker (116) to generate the sound waves (110 and/or 126 of FIG. 1A).

In some embodiments, the support section surface (214-5) as shown in FIG. 3A comprises a planar surface, which may, but is not limited to only, be flush (or coplanar) with the front image viewing area of the display (102). In some embodiments, the planar surface in the support section surface (214-5) may be vertical in relation to an imaginary plane extending from the audience area (108 of FIG. 1A). In some embodiments, the planar surface in the support section surface (214-1) may be slightly inclined, such as within 5 degrees, 15 degrees, etc., from a vertical direction to the imaginary plane extending from the audience area (108 of FIG. 1A).

In some embodiments, while the sound bar (104) is supported by or mounted on a first rigid support 312, the display (102) is supported by or mounted on a second rigid part (not shown) of the support section (320).

In some embodiments, a sound generation device such as a LFE speaker 116 may be placed on a base in a triangular spatial void 304 formed in the support section (320), or cut out from the third support section surface area (214-3) as shown in FIG. 3A.

In some embodiments, the sound reflection section (318) comprises a (e.g., planar, curved, etc.) surface slanted or inclined (e.g., 45 degrees, etc.) towards the audience area (108 of FIG. 1A). A portion or all of the surface of the sound reflection section (318) can be specifically treated to reflect the sound waves generated by the sound bar (104) with high reflectance in one or more selected ranges of audible frequencies such as a broad range, a multi-band range, a single-band range, etc., over all or some parts of the whole audible frequency spectrum (e.g., 20 to 20 kHz, etc.) to the human auditory system.

In some embodiments, a longitudinal direction 216 of the sound bar (104) is parallel to one or more planar surface (e.g., 212-4, 214-5, etc.) in the reflection section surfaces (212-4 through 212-6), in the support section surfaces (214-5 and 214-6), in (e.g., an image rendering surface of, etc.) the display (102), etc.

FIG. 3B illustrates an example side view of the sound reflection assembly (300) as viewed with an isometric perspective from a position (e.g., an infinite position, etc.) coplanar with the support section surface (214-5 of FIG. 3A) in the support section (320).

As illustrated in FIG. 3B, the sound waves (110) generated by the sound bar (104) may be directional and transmitted towards the sound reflection section (318), or a portion of the reflection section surface (212-4) thereof, in a solid angle 208. In some embodiments, the support section (320) is so structured as not to present any physical hindrance in sound wave propagation directions in the solid angle (208) from the sound bar (104) to the portion of the reflection section surface (212-4).

In some embodiments, most (e.g., 51%, 60%, 70%, 80%, 90%, 95% or more, etc.) or even all of the energy of the sound waves (110) generated by the sound bar (104) is transmitted within the first solid angle (208) from the sound bar (104) to the sound reflection section (318), or the portion of the reflection section surface (212-4) thereof. In some embodiments, the sound bar (104) is specifically configured to direct the sound waves (110) away from other areas such as the display (102) mounted with the sound bar (104), the support section surfaces (214-4 through 214-6 of FIG. 3A) of the support section (320), etc.

Additionally, optionally, or alternatively, the sound reflection section (318) may be specifically configured to reflect the sound waves (110) incident on the portion of the reflection section surface (212-4) with high reflectance into a second solid angle 210 in which high quality sound (e.g., stereoscopic sound field images, two-dimensional sound field images, etc.) originated from the sound bar (104) is provided to the audience (106) in the audience area (108). In some embodiments, the second solid angle (210) in which most (e.g., 51%, 60%, 70%, 80%, 90%, 95% or more, etc.) or even all of the energy of the sound waves (110) reflected by the sound reflection section (318) is transmitted is the same as, or the substantially same as (e.g., within a 5% difference, within a 10% difference, etc.), the first solid angle (208).

In some embodiments, the second solid angle (210) in which most (e.g., 51%, 60%, 70%, 80%, 90%, 95% or more, etc.) or even all of the energy of the sound waves (110) reflected by the sound reflection section (118) is transmitted is less than the first solid angle (208).

In some embodiments, the second solid angle (210) in which most (e.g., 51%, 60%, 70%, 80%, 90%, 95% or more, etc.) or even all of the energy of the sound waves (110) reflected by the sound reflection section (118) is transmitted is larger than the first solid angle (208).

In some embodiments, the portion of the reflection section surface (212-4), in the sound reflection section (318), on which the sound waves (110) generated by the sound bar (104) incident, may be configured to be one of a planar surface, a curved surface, a grooved surface, a textured surface, a bumpy surface, etc. In some embodiments, one or more of specific spatial features, sound-related properties, etc., may be implemented in the sound reflection section (318), or the portion of the reflection section surface (212-4) therein. These specific spatial features, sound-related properties, etc., may be particular to the type of the sound bar (104), one or more types of speaker elements in the sound bar (104), etc.

In some embodiments, the portion of the reflection section surface (212-4), in the sound reflection section (318), on which the sound waves (110) generated by the sound bar (104) incident, may be implemented with one or more of specific spatial features, sound-related properties, etc., to be (e.g., highly, etc.) reflective or (e.g., spatially divergent, spatially convergent, etc.) directional of frequencies, frequency bands, frequency ranges, frequency compositions, etc., as generated by the sound bar (104).

In some embodiments, the support section (320) may comprise a back support infrastructure enclosed by an outer surface 316 as shown in FIG. 3B. The back support infrastructure may be designed to provide mechanical stability to the sound reflection assembly (300) with which the display (102), the sound bar (104), the LFE speaker (116), etc., are mounted or disposed. Additionally, optionally, or alternatively, the outer surface (316) of the back support infrastructure comprises a technician access panel (not shown), which may be opened by a technician to service audio and/or video modules integrated with the sound reflection assembly (300), access data ports of audio and/or video modules in the back support infrastructure, etc.

In some embodiments, as shown in FIG. 3B, the support section (320) provides no, or is free of, physical hindrance for lines of sight from the audience (106) in the audience area (108) to the display (102) placed in relation to (e.g., flushed with, coplanar with, non-coplanar with, tilted from, etc.) the support section (320).

In some embodiments, one or more of the sound reflection section (318), the support section (320), etc., are not foldable. In some embodiments, at least a part of the sound reflection section (318), the support section (320), etc., is foldable.

In some embodiments, one or more of the sound reflection section (318), the support section (320), etc., are not movable (or immobile) relative to one another. In some embodiments, at least a part of the sound reflection section (318), the support section (320), etc., is movable relative to one another.

In some embodiments, one or more of the sound reflection section (318), the support section (320), etc., are rigid structures, or form a single rigid structure, for example to reduce sound vibration and sound dampening when the sound waves (110) generated by the sound bar (104) incident on the sound reflection section (318), thereby increasing sound reflection for these sound waves (110) from the sound reflection section (318).

In some embodiments, a sound bar (e.g., 104, etc.) as described herein generates (or a majority of) sound waves (e.g., 110, etc.) representing (e.g., virtual, etc.) sound sources as if these sound sources are emitting the sound waves (110) from specific directions and/or specific distances relative to a listener in an audience area (e.g., 108, etc.) as described herein. In some embodiments, a sound reflection assembly (e.g., 100, etc.), or a sound reflection section (e.g., 318, etc.) therein, are configured to reflect the sound waves (110) from the sound bar (104) in a manner that direction and/or distance information as represented by the sound waves (110) is preserved so that the listener can perceive a high quality sound field image when the listener's ears receives a portion of the sound waves (110).

In some embodiments, a LFE speaker (e.g., 106, etc.) as described herein generates sound waves (e.g., 124, etc.) that need not to be represented accurately in terms of direction and/or distance information as represented by the sound waves (124). In some embodiments, the sound waves (124) generated by the LFE speaker (106) may be directly transmitted from the LFE speaker (106), reflected from a support section (e.g., 320, etc.) rather than necessarily from a sound reflection section (e.g., 318, etc.), without impacting a high quality sound field image conveyed by sound waves (e.g., 110) generated by a sound bar (e.g., 104) as described herein.

For the purpose of illustration only, it has been described that sound waves generated by a sound bar are reflected by a sound reflection assembly, or a sound reflection section therein. It should be noted that in various embodiments, other shapes of audio speakers can be used to generate sound waves to be reflected by a sound reflection assembly, or a sound reflection section therein, under techniques as described herein. For example, speaker elements such as high frequency speaker elements, mid-frequency speaker elements, low frequency speaker elements, etc., which may be packaged in a sound bar, may also be packaged in one or more different shapes. For example, in some embodiments, instead of or in addition to a sound bar, one or more other shapes (e.g., rectangles, polygonal shapes, irregular shapes, etc.) that comprise one or more of high frequency speaker elements, mid-frequency speaker elements, low frequency speaker elements, etc. In a particular example embodiments, instead of or in addition to a sound bar, one or more of high frequency speaker elements, mid-frequency speaker elements, low frequency speaker elements, etc., may be packaged in an arc shape that is configured to emit sound waves towards a sound reflection section of a sound reflection assembly as described herein.

For the purpose of illustration only, it has been described that a rectangular LFE speaker is placed on top of a support base of a sound reflection assembly. It should be noted that in various embodiments, other shapes of LFE speakers can be used to generate LFE sound waves. In some embodiments, a sound reflection assembly may provide a different way of supporting or mounting one or more LFE speakers. In some embodiments, a sound reflection assembly may be free of a LFE speaker that is separate from a sound bar, a directional speaker, etc.; for example, LFE sound waves may be generated by a sound bar, a directional speaker, etc., instead of a designated LFE speaker.

For the purpose of illustration only, it has been described that a display placed with a sound reflection assembly is used to render images. It should be noted that in various embodiments, other types of displays can be used to render images. In some embodiments, a sound reflection assembly may operate in conjunction with a different type of display such as a projection display device, a screen other than one spatially connected with the sound reflection assembly. In some embodiments, a sound reflection assembly may operate without a display.

The sound reflection assembly (300) can be contained in an enclosure. In a non-limiting example, the sound reflection assembly (300) has a height of two (2) to seven (7) feet, a width (in the horizontal direction of FIG. 3A) of about two (2) to six (6) feet, and a depth (in the horizontal direction of FIG. 3B) of one (1) to four (4) feet.

The sound reflection assembly (300) may comprise of acoustic panels configured to reflect sound waves, for example, in the sound reflection section (318). The sound reflection assembly (300) may also comprise of acoustic panels configured to absorb sound waves, for example, in parts immediately surrounding the sound bar (104). Various parts of the sound reflection assembly (300) may use one or more of MDF materials, fiberglass, sheet metals, solid wood, plastics, composite materials, hardboard, particle board, etc. Various parts of the sound reflection assembly (300) may be painted with eggshell paint materials, semi-gloss paint materials, flat or gloss paint materials, epoxy paint materials, etc.

5. EXAMPLE EMBODIMENTS

In an embodiment, a sound reflection assembly (e.g., FIG. 1, FIG. 1B, FIG. 2A through FIG. 2D, FIG. 3A through FIG. 3D, etc.) comprises a rigid structure (e.g., 100 of FIG. 1A or FIG. 1B, FIG. 2A, FIG. 3A, etc.) having a sound reflection section (e.g., 118 of FIG. 1A or FIG. 1B, FIG. 2A, 318 of FIG. 3A, etc.) and a support section (e.g., 120 of FIG. 1A or FIG. 1B, FIG. 2A, 320 of FIG. 3A, etc.), a rigid part (e.g., 112 of FIG. 1A or FIG. 1B, FIG. 2A, 312 of FIG. 3A, etc.) in the support section, etc. A directional sound generation module (e.g., 104 of FIG. 1A or FIG. 1B, FIG. 2A, FIG. 3A, etc.) is placed on the rigid part, and spatially oriented to direct sound waves generated by one or more speaker elements in the directional sound generation module towards the sound reflection section to be reflected by the sound reflection section towards an audience in an audience area in front of the sound reflection assembly.

In an embodiment, the support section represents a lower section of the rigid structure, and wherein the sound reflection section is an upper section of the rigid structure.

In an embodiment, a sound reflective surface of the sound reflection section forms a contiguous surface with a front surface of the support section.

In an embodiment, the directional sound generation module is configured to direct the sound waves away from the support section.

In an embodiment, the support section comprises a vertical planar surface facing the audience. In an embodiment, the sound reflection section comprises a slanted planar surface for reflecting the sound waves.

In an embodiment, the sound reflection section comprises a sound reflective area specifically treated to reflect sounds in one or more specific ranges of sound wave frequencies audible to human.

In an embodiment, a longitudinal direction of the directional sound generation module is in parallel to a front outer surface of the sound reflection section and further in parallel to a front outer surface of the support section.

In an embodiment, the rigid part is one of one or more parts mounted on the support section, or one or more portions molded unitarily with the support section.

In an embodiment, the sound reflection assembly comprises one or more of wheels, or stationary footers.

In an embodiment, a display is secured with a second rigid part of the support section. In an embodiment, images rendered on the display are synchronized with the sound waves generated by the directional sound generation module. In an embodiment, a computing device renders images on the display and drives the directional sound generation module to generate the sound waves.

In an embodiment, the directional sound generation module comprises one or more of left speaker elements, right speaker elements, center speaker elements, or low frequency effect speaker elements.

In an embodiment, a low frequency effect speaker is disposed on top of a support base in the support section.

In an embodiment, the sound reflection section comprises a reflective surface to divergently reflect the sound waves generated by the directional sound generation module to cover a relatively large audience area. In an embodiment, the sound reflection section comprises one or more of detachable patches, re-attachable patches, detachable strips, re-attachable patches, detachable panels, or re-attachable panels. In an embodiment, the sound reflection section is configured with one or more of specific sound reflection properties or sound related properties.

In an embodiment, the support section is free of physical hindrance in sound wave propagation directions of the sound waves from the directional sound generation module to the sound reflection section. In an embodiment, the support section is free of physical hindrance for lines of sight from an audience in an audience area in front of the support section to a display mounted with the support section.

In an embodiment, at least one of the sound reflection section or the support section comprises no foldable parts.

In an embodiment, at least one of the sound reflection section or the support section comprises foldable parts. In an embodiment, the sound reflection assembly further comprises a back assembly part.

In an embodiment, the directional sound generation module comprises a sound bar. In an embodiment, the directional sound generation module is not a spatial shape other than a rectangular shape.

Note that, although separate embodiments are discussed herein, any combination of embodiments and/or partial embodiments discussed herein may be combined to form further embodiments.

6. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A sound reflection assembly, comprising:
   a rigid structure having a sound reflection section and a support section;
   a rigid part in the support section;
   a directional sound generation module placed on the rigid part, wherein the directional sound generation module is spatially oriented to direct sound waves generated by one or more speaker elements in the directional sound generation module towards the sound reflection section to be reflected by the sound reflection section towards an audience in an audience area in front of the sound reflection assembly;
   a display mounted with the support section;
   wherein image rendering light emitted or reflected from the display reaches the audience area in front of the sound reflection assembly without any obstruction;
   wherein the one or more speaker elements in the directional sound generation module represent directional speaker elements specifically configured to direct the sound waves as generated by the one or more speaker elements away from other areas that are different from the sound reflection section.

2. The sound reflection assembly as recited in claim 1, wherein the support section represents a lower section of the rigid structure, and wherein the sound reflection section is an upper section of the rigid structure.

3. The sound reflection assembly as recited in claim 1, wherein a sound reflective surface of the sound reflection section forms a contiguous surface with a front surface of the support section.

4. The sound reflection assembly as recited in claim 1, wherein the directional sound generation module is configured to direct the sound waves away from the support section.

5. The sound reflection assembly as recited in claim 1, wherein the support section comprises a vertical planar surface facing the audience.

6. The sound reflection assembly as recited in claim 1, wherein the sound reflection section comprises a slanted planar surface for reflecting the sound waves.

7. The sound reflection assembly as recited in claim 1, wherein the sound reflection section comprises a sound reflective area specifically treated to reflect sounds in one or more specific frequency ranges that are audible to human.

8. The sound reflection assembly as recited in claim 1, wherein a longitudinal direction of the directional sound generation module is in parallel to a front outer surface of the sound reflection section and further in parallel to a front outer surface of the support section.

9. The sound reflection assembly as recited in claim 1, wherein the rigid part is one of one or more parts mounted on the support section, or one or more portions molded unitarily with the support section.

10. The sound reflection assembly as recited in claim 1, wherein the sound reflection assembly comprises one or more of wheels, or stationary footers.

11. The sound reflection assembly as recited in claim 1, wherein the display is secured with a second rigid part of the support section.

12. The sound reflection assembly as recited in claim 11, wherein images rendered on the display are synchronized with the sound waves generated by the directional sound generation module.

13. The sound reflection assembly as recited in claim 11, wherein a computing device renders images on the display and drives the directional sound generation module to generate the sound waves.

14. The sound reflection assembly as recited in claim 1, wherein the directional sound generation module comprises one or more of left speaker elements, right speaker elements, center speaker elements, or low frequency effect speaker elements.

15. The sound reflection assembly as recited in claim 1, wherein a low frequency effect speaker is disposed on top of a support base in the support section.

16. The sound reflection assembly as recited in claim 1, wherein the sound reflection section comprises a reflective surface to divergently reflect the sound waves generated by the directional sound generation module to cover a relatively large audience area.

17. The sound reflection assembly as recited in claim 1, wherein the sound reflection section comprises one or more of detachable patches, re-attachable patches, detachable strips, re-attachable patches, detachable panels, or re-attachable panels.

18. The sound reflection assembly as recited in claim 1, wherein the sound reflection section is configured with one or more of specific sound reflection properties or sound related properties.

19. The sound reflection assembly as recited in claim 1, wherein the support section is free of physical hindrance in sound wave propagation directions of the sound waves from the directional sound generation module to the sound reflection section.

20. The sound reflection assembly as recited in claim 1, wherein the support section is free of physical hindrance for lines of sight from an audience in an audience area in front of the support section to the display mounted with the support section.

21. The sound reflection assembly as recited in claim 1, wherein at least one of the sound reflection section or the support section comprises no foldable parts.

22. The sound reflection assembly as recited in claim 1, wherein at least one of the sound reflection section or the support section comprises foldable parts.

23. The sound reflection assembly as recited in claim 1, further comprising a back assembly part.

24. The sound reflection assembly as recited in claim 1, wherein the directional sound generation module comprises a sound bar.

25. The sound reflection assembly as recited in claim 1, wherein the directional sound generation module is a spatial shape other than a rectangular shape.

\* \* \* \* \*